United States Patent

Rouge et al.

[11] Patent Number: 6,022,397
[45] Date of Patent: Feb. 8, 2000

[54] PSA PROCESS USING AN ADSORBENT WITH HETEROGENEOUS PROPERTIES OF CAPACITY AND/OR SELECTIVITY

[75] Inventors: Dominique Rouge, Malakoff; Jacques Labasque, Versailles; Serge Moreau, Velizy Villacoublay; Christophe Montfort, Buc, all of France

[73] Assignee: L'Air Liquide, Societe Anonyme Pour L'Etude et L'Exploitation des Procedes Georges Claude, Paris Cedex, France

[21] Appl. No.: 09/060,462

[22] Filed: Apr. 15, 1998

[30] Foreign Application Priority Data

Dec. 1, 1997 [FR] France ................... 97 15090

[51] Int. Cl.$^7$ .................................................. B01D 53/047
[52] U.S. Cl. ................... 95/96; 95/130; 95/902
[58] Field of Search ......... 95/96–98, 100–105, 95/130, 902; 96/108, 130, 144

[56] References Cited

U.S. PATENT DOCUMENTS

| | | | |
|---|---|---|---|
| 4,481,018 | 11/1984 | Coe et al. | 95/130 |
| 4,859,217 | 8/1989 | Chao | 95/130 |
| 4,917,710 | 4/1990 | Haruna et al. | 95/102 |
| 5,114,440 | 5/1992 | Reiss | 95/96 |
| 5,152,813 | 10/1992 | Coe et al. | 95/103 |
| 5,174,979 | 12/1992 | Chao et al. | 95/130 X |
| 5,258,060 | 11/1993 | Gaffney et al. | 95/101 |
| 5,266,102 | 11/1993 | Gaffney et al. | 95/103 |
| 5,268,023 | 12/1993 | Kirner | 95/103 |
| 5,429,666 | 7/1995 | Agrawal et al. | 95/103 X |
| 5,529,607 | 6/1996 | Tan | 95/103 X |
| 5,529,610 | 6/1996 | Watson et al. | 95/100 |
| 5,536,299 | 7/1996 | Girard et al. | 95/103 X |
| 5,616,170 | 4/1997 | Ojo et al. | 95/101 |
| 5,656,066 | 8/1997 | Reiss et al. | 95/101 X |
| 5,658,370 | 8/1997 | Vigor et al. | 95/130 X |
| 5,868,818 | 2/1999 | Ogawa et al. | 95/130 X |

FOREIGN PATENT DOCUMENTS

| | | |
|---|---|---|
| 0 374 631 | 6/1990 | European Pat. Off. . |
| 0 589 406 | 3/1994 | European Pat. Off. . |

*Primary Examiner*—Robert Spitzer
*Attorney, Agent, or Firm*—Young & Thompson

[57] ABSTRACT

For the separation of nitrogen from oxygen in air, an adsorbent is used which preferentially adsorbs the nitrogen. The adsorbent is a heterogeneous zeolite whose particles have a distribution of the capacity to adsorb nitrogen relative to oxygen, with a ratio ($\sigma_c/\mu_c$) comprised between 0.02 and 0.15, and/or having a distribution of selectivity of adsorption of nitrogen relative to oxygen with a ratio ($\sigma_s/\mu_s$) comprised between 0.02 and 0.25.

12 Claims, 2 Drawing Sheets

PSA PROCESS USING AN ADSORBENT WITH HETEROGENEOUS PROPERTIES OF CAPACITY AND/OR SELECTIVITY

CROSS REFERENCE TO RELATED APPLICATION

This application corresponds to French application 97 15090 of Dec. 1, 1997, the disclosure of which is incorporated herein by reference.

FIELD OF THE INVENTION

The invention comprises an adsorbent with heterogeneous adsorption properties and a PSA process, and more particularly a VSA-type process, for the separation of a gaseous flow, in particular a gaseous flow containing essentially oxygen and nitrogen, such as air, using such a heterogeneous adsorbent.

BACKGROUND OF THE INVENTION

Air gases have a great industrial interest because they have many applications in very different technical fields: production of steel, glass or paper, medicine, metal welding, combustion or pollution control, for example.

One of the techniques used at present to produce these gases is the so-called "PSA" (Pressure Swing Adsorption) technique, which covers not only PSA processes as such, but also similar processes, such as VSA processes (Vacuum Swing Adsorption) or MPSA (Mixed Pressure Swing Adsorption). According to this PSA technique, when the gaseous mixture to be separated is air and the component to be recovered is oxygen, said oxygen is separated from said gaseous mixture by preferential adsorption of at least the nitrogen on a material that is preferentially adsorbent to nitrogen, said adsorption being carried out by pressure variation applied in the separation zone containing said adsorbent material. The oxygen that is not at all or little adsorbed is recovered at the outlet of said separation zone; the latter has a purity in general greater than 90%, even 93% or more.

More generally, a PSA process for the non-cryogenic separation of a gaseous mixture comprising a first compound that adsorbs preferentially to an adsorbent material and a second compound that adsorbs less preferentially to said adsorbent material than the first compound, for the production of said second compound, comprises in a cyclic manner:

- a step of preferential adsorption of at least one said first compound on said adsorbent material, at an adsorption pressure called "high pressure", with recovery of at least a portion of the second compound thus produced;
- a step of desorption of the first compound thus trapped by the adsorbent, at a desorption pressure lower than the adsorption pressure, called "low pressure";
- a step of repressurization of the separation zone comprising the adsorbent, by progressive passage from said low pressure to said high pressure.

However, it is known that the efficiency of separation of a gaseous mixture, such as air, depends on numerous parameters, particularly the high pressure, the low pressure, the type of adsorbent material used and the affinity of the latter for the compounds to be separated, the composition of the gaseous mixture to be separated, the temperature of adsorption of the mixture to be separated, the size and shape of the particles of adsorbent, the composition of the particles and the temperature gradient within said adsorbent bed.

Until now, although no general law of behavior has been determined, given that it is very difficult to interconnect the different parameters, it is also known that the nature and the properties of the adsorbent play an important role in the overall efficiency of processes of the PSA type.

At present, the zeolites, particularly types A, X, Y or LSX (Low Silica X), are the most common adsorbents used in PSA processes. The zeolite particles contain usually mono, di and/or trivalent cations, for example cations of alkali metals, alkaline-earth metals, or lanthanides, incorporated during the synthesis of the particles of zeolite and/or subsequently added by an ionic exchange technique.

Ion exchange is generally carried out by placing the non-exchanged or raw zeolite particles into contact with a solution of one or several metallic salts comprising the cation or cations to be incorporated in the zeolitic structure and subsequent recovery of the exchanged zeolite, which is to say zeolite containing a given quantity of metallic cations. The proportion of metallic cations introduced into the zeolitic structure is called the exchange load.

Conventionally, it is recommended to try to obtain a perfectly homogeneous adsorbent, which is to say having no or the least possible variations not only of exchange load, but also of capacity and/or selectivity; the capacity and the selectivity of the adsorbent being parameters known to those in the art and defined in numerous publications, particularly U.S. Pat. No. 4,481,018, EP-A-0 589 406 or EP-A-0 598 391.

The concept of homogeneous adsorbent is clear from EP-A-0 589 406 and EP-A-0 598 391, given that these latter teach the use in a PSA process of an adsorbent having a given capacity and selectivity and chosen within a certain range of values. In other words, these publications neither teach nor take account of the existence of possible fluctuations of capacity and/or selectivity of the adsorbent, which is to say a heterogeneity of these latter as to one and/or the other of these two parameters.

As a result, at present, the adsorbents said to be good adsorbents for the separation of gases, particularly for the separation of air gases by a PSA type process, are those whose capacity and/or selectivity are the most homogeneous possible.

More generally, no prior art publication has shown or emphasized, until now, the importance that can attach to the degree of heterogeneity of capacity and/or selectivity of a given adsorbent, and the impact of this degree of heterogeneity particularly on the performance of a PSA process using such a heterogeneous adsorbent.

Moreover, the adsorbents most used in processes for the separation of gases, in particular air, are strongly exchanged zeolites, generally more than 80%, with very costly metal cations, such as particularly lithium cations. In this regard can be mentioned U.S. Pat. Nos. 5,268,023 and 5,152,813.

It will thus be immediately apparent that the fact of not being able to use other than zeolites for the separation of gaseous mixtures, particularly strongly exchanged ones, having a homogeneous capacity for adsorption and selectivity of adsorption, carries with it the requirement for rigorous quality control and meticulous selection of the adsorbents after their production. There is thus a high rejection rate and an inevitable and considerable increase in the overall cost of production and cost of the process of separation of the gases thus produced.

SUMMARY OF THE INVENTION

The object of the present invention is hence to provide an adsorbent with heterogeneous capacity and/or selectivity whose performance remains acceptable from an industrial standpoint, despite the heterogeneity of the properties of adsorption of the different particles of adsorbent and a process for separating gas utilizing such a heterogeneous adsorbent.

Thus, with equivalent performance, the process using a heterogeneous adsorbent according to the invention leads to much less cost than a conventional process using a homogeneous adsorbent, given that it permits a greater flexibility as to the properties of adsorption of the adsorbent. In the framework of the present invention, there is meant by adsorbent, a single type product, for example a given zeolite, particularly zeolite A or zeolite X.

The present invention thus relates to a heterogeneous adsorbent for the separation of gases comprising adsorbent particles having a distribution of adsorption capacity of nitrogen with a ratio ($\sigma_c/\mu_c$) comprised between about 0.02 and 0.15, and/or having a distribution of selectivity of adsorption of nitrogen relative to oxygen with a ratio ($\sigma_s/\mu_s$) comprised between about 0.02 and 0.25.

In the framework of the present invention, the parameter $\sigma_c$ designates the standard deviation of the distribution of adsorption capacity and the parameter $\mu_c$ the mean of said distribution, and the $\sigma_s$ designates the standard deviation of the distribution of selectivity of adsorption and the parameter $\mu_s$ the mean of said distribution.

In practice, the parameters $\sigma_c$, $\sigma_s$, $\mu_c$ and $\mu_s$ are estimated by a conventional statistical method, for example the maximum probability method or the method of estimation by intervals, over a sufficient number of randomly selected specimens, for example at least 50 specimens and preferably at least 100 specimens, of adsorbent particles of sufficient quantity to be able to measure said capacities and selectivities of the different specimens.

As the case may be, the heterogeneous adsorbent of the invention can include one or several of the following characteristics:

the ratio ($\sigma_c/\mu_c$) is comprised between 0.02 and 0.10, preferably between about 0.03 and 0.08 the ratio ($\sigma_s/\mu_s$) is comprised between about 0.02 and 0.20, preferably between about 0.03 and 0.18 it is selected from the group consisting of exchanged zeolites and non-exchanged zeolites.

it is selected from the group consisting of zeolites of types X, Y, A, ZSM-3, ZSM-5, mordenite, faujasite or clinoptilolite.

it contains cations selected from the group consisting of cations of lithium, calcium, zinc, copper, manganese, magnesium, nickel, potassium, strontium or any alkaline metal or alkaline-earth metal, and their mixtures.

it contains at least 50% of cations of lithium and/or at least 10% of calcium cations and/or at least 5% of zinc cations.

it has a ratio Si/Al of 1 to 1.25 and preferably about 1, and is preferably a zeolite LSX.

The invention moreover relates to a PSA process for the separation of a gas flow containing at least a first component that preferentially adsorbs to at least one heterogeneous adsorbent according to the invention and at least one second component that it adsorbs less preferentially to at least said heterogeneous adsorbent than said first compound.

As the case may be, the process of the invention can comprise one or several of the following characteristics:

the gas flow to be separated comprises oxygen and nitrogen, preferably the gas flow is air; the air, in the framework of the present invention, being contained within a building or an enclosure that is heated or not, or outside air, which is to say under atmospheric conditions, taken as is or if desired pretreated, the first component is nitrogen and the second component is oxygen; and a gas flow rich in oxygen is produced, which is to say comprising generally at least 90% of oxygen.

it is of the VSA type, the high adsorption pressure is comprised between $10^5$ Pa and $10^7$ Pa, preferably of the order of $10^5$ Pa to $10^6$ Pa, and/or the low pressure of desorption is comprised between $10^4$ Pa and $10^6$ Pa, preferably of the order of $10^4$ Pa to $10^5$ Pa.

the supply temperature is comprised between 10° C. and 80° C., preferably between 25° C. and 60° C.

The invention moreover relates to a device adapted to practice a PSA process, such as the process described above, comprising at least one adsorber and preferably one to three adsorbers.

Moreover, it should be noted that the present invention is applicable also to each of the adsorbers of a process using several adsorbents, for example a multibed process.

DETAILED DESCRIPTION OF THE INVENTION

Figure 1:
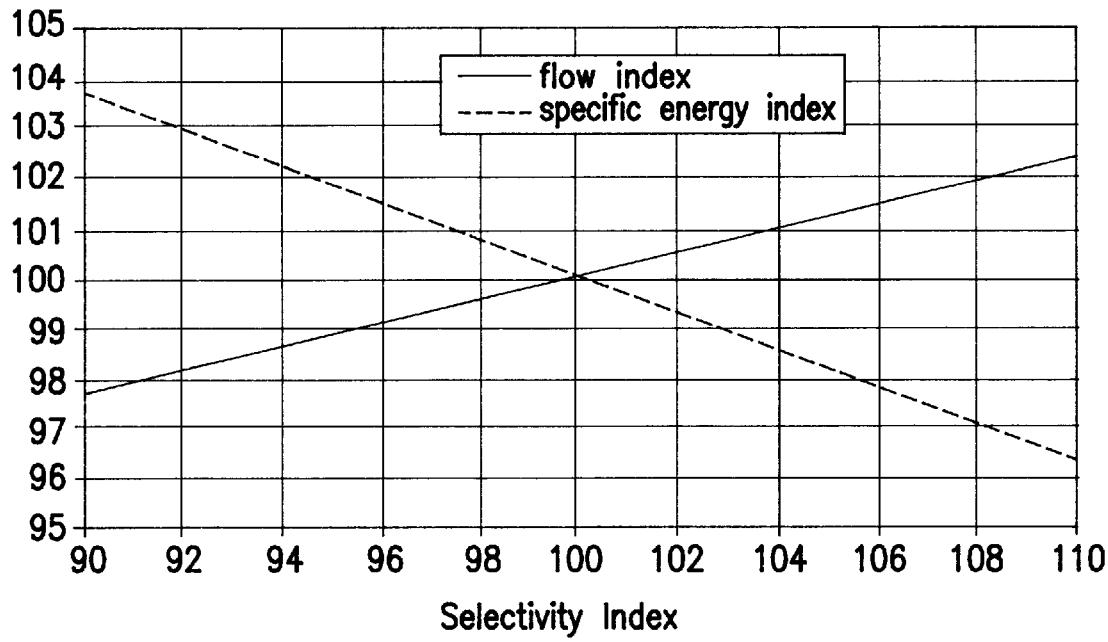

The invention will now be described in greater detail with the aid of examples of simulation given by way of illustration, but non-limiting.

Conventionally, when a gas separation unit is dimensioned, such as particularly a VSA type unit for the separation of gases from air, it is usual to consider the homogeneity of the properties of adsorption of the molecular sieve before using it, which it to say the adsorbent used. In other words, the dimensioning of the PSA units ordinarily takes into consideration the adsorbent contained within the adsorber or adsorbers being totally homogeneous, in particularly as concerns its characteristics of adsorption capacity of nitrogen and selectivity of adsorption of nitrogen relative to oxygen.

However, as is made plain by the present invention, the inventors have discovered that the industrial sieves or adsorbents, the uncertainties of production or of primary materials used for their synthesis, can give rise to a more or less great variety of properties having more or less impact on the overall performance of the separation process.

A study of this diversity of properties of the adsorbent, which is to say its heterogeneity, and of the impact of this heterogeneity on the performance of a PSA process for the separation of air, has been carried out by simulation, taking account of the unbalances from bed to bed altogether, corresponding to an original unbalance between adsorbers which can occur upon filling the adsorbers because of the disparities of the properties of the adsorbent particles resulting directly from production and, in general, different production lots, each adsorber being filled with a single bed of the adsorbent in question.

To simulate the inhomogeneities adapted to exist in adsorbers of a PSA unit, such as a VSA unit, the simulations given hereafter were carried out on the basis of the assumption that the adsorbers are filled with particles of adsorbent having different properties from one adsorber to the other, so as to create an unbalance between said adsorbers.

It is to be noted that the case of unforeseen unbalance, which is to say caused by accidental pollution of the adsorbent for example, is also taken care of.

For simplification, the studies set forth hereafter have been carried out on the assumption that the gaseous mixture to be separated is ambient air, that the first component adsorbed preferably on the adsorbent is nitrogen and that the second component adsorbed less preferentially on the adsorbent and which must be recovered, is oxygen.

More precisely, the unbalances between adsorbers have been simulated (adiabatic manner) with the help of a simulation program which uses the principles of conservation of mass, conservation of enthalpy, conservation of the quantity of movement and which uses the Linear Driving Force model (see "Principles of Adsorption and Adsorption Processes", John-Wiley & Sons, 1984; D. M. Ruthven, p. 242–243; or "Pressure Swing Adsorption", VCS Publishers, 1994, p. 58–61) for the evaluation of the kinetics of solid-gas transfers within the adsorbent mass. Such simulation models are particularly described in Pressure Swing Adsorption, Ruthven, Farooq and Knaebel, VCH Publishers, 1994, p. 172–209; and in Fluid Flow Through Packed Columns, S. Ergun, Chem. Engr. Prog., 48(2), 89(1952). Solving the equations can as to itself be carried out for example by means of a DIVPAG program of the Mathematical Library IMSL (International Mathematical and Statistical Library) sold by Microsoft™; or by the ADSIM program sold by Aspentech™. Those skilled in the art are fully aware of the choice of suitable simulation programs from among numerous available programs on the market and can introduce the preceding data. If needed, reference can also be had to the article of D. G. Hartzog and S. Sircar; Adsorption, 1, 133–151 (1995), Sensitivity of PSA Process Performance to Input Variables, describing a similar program.

The simulation parameters in question for cycles with two or as the case may be three adsorbers, are the adsorption capacity for nitrogen by the adsorbent (nitrogen capacity) and the selectivity of adsorption of the adsorbent for nitrogen relative to oxygen.

The simulations are carried out in constant machines for the following cycles:

a cycle with two adsorbers (A and B) of about 2×40s with high pressure of 1.4 bars and low pressure of 0.4 bar;

a cycle with three adsorbers (A, B and C) of about 3×30s with high pressure of 1.1 bars and low pressure of 0.3 bar.

In addition to the performance of the VSA unit (production flow rate, mean purity of oxygen product and specific energy), it is important to maintain a certain number of parameters within acceptable bounds. In particular, the profiles of pressure in the adsorbers and if desired in the storages should not reach values that might endanger the material, particularly the machines (vacuum pumps, blowers, compressors . . . ). Similarly, the profile of instantaneous purity of the gas product should not have too strong an unbalance, incompatible with the process of the client. This is why these parameters have also been recorded in simulations of unbalances of adsorbent properties, so as to determine the level of unbalance that in practice is acceptable.

EXAMPLE 1

Unbalance of Selectivity of the Adsorbent

This example seeks to determine the impact of unbalance of selectivity of the adsorbent between adsorbers for a cycle with two adsorbers (A and B) . The results obtained are set forth in Table I hereafter in indexed form and are schematically shown in FIG. 1.

TABLE I

| Test No. | S1 | S2 | Sref | S3 | S4 |
|---|---|---|---|---|---|
| Selectivity of adsorber A | 100 | 100 | 100 | 100 | 100 |
| Selectivity of adsorber B | 110 | 105 | 100 | 95 | 90 |
| Flow rate | 102 | 101 | 100 | 99 | 98 |
| Specific energy | 96 | 98 | 100 | 102 | 104 |

Sref is a reference test corresponding to the absence of unbalance between adsorbers; S1 and S2 show better selectivity for nitrogen of the adsorbent contained in adsorber B (relative to that of adsorber A and to the reference); and S3 and S4 show a decreased selectivity for nitrogen of the adsorbent contained in adsorber B.

The flow rate is the mean quantity of oxygen product per hour and the specific energy corresponds to the mean power consumed per hour divided by the flow rate.

Moreover, the critical parameters for safety of the material and of production are not affected:

unbalance of profile of pressure in the adsorbers: zero unbalance of profile of pressure of the production capacity: zero unbalance of the profile of content within the production capacity: zero

EXAMPLE 2

Unbalance of Nitrogen Capacity

This example is analogous to Example 1, and seeks to determine the effect of unbalance of capacity of the sieve between adsorbers for a cycle with two adsorbers.

Figure 2:
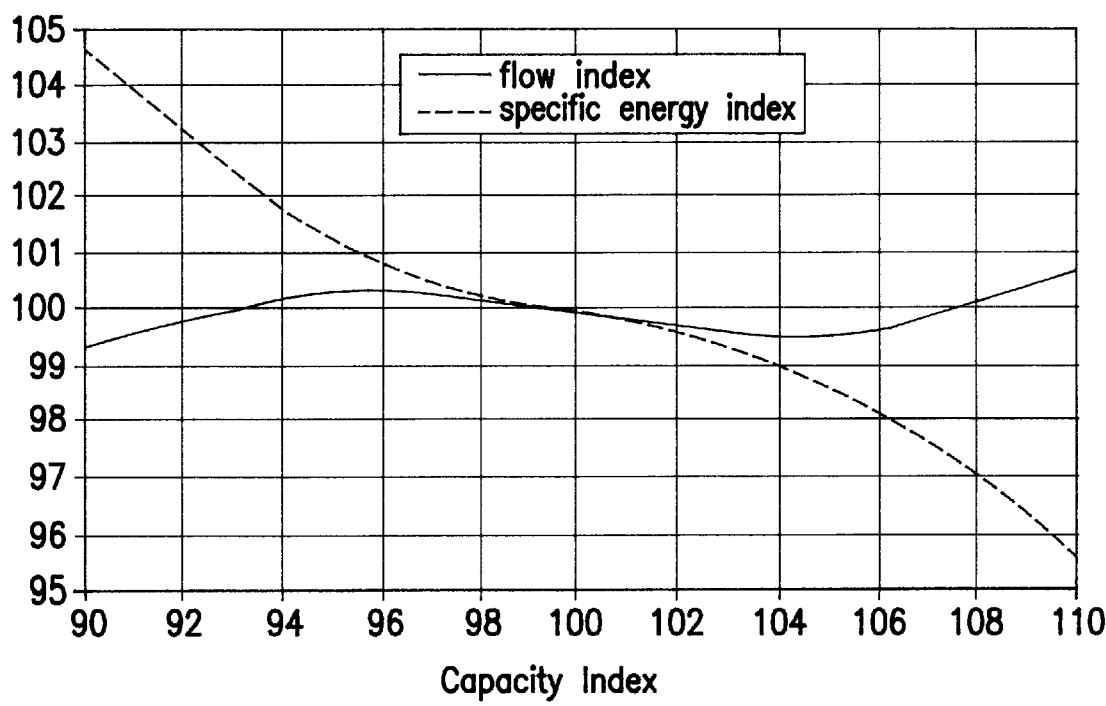

The results obtained are set forth in Table II hereafter, in tabular form and are shown schematically in FIG. 2.

TABLE II

| Test No. | C1 | C2 | Cref | C3 | C4 |
|---|---|---|---|---|---|
| Nitrogen capacity of adsorber A | 100 | 100 | 100 | 100 | 100 |
| Nitrogen capacity of adsorber B | 110 | 105 | 100 | 95 | 90 |
| Flow rate | 101 | 100 | 100 | 100 | 99 |
| Specific energy | 96 | 99 | 100 | 101 | 105 |

Cref is a reference test corresponding to the absence of unbalance between adsorbers; C1 and C2 show better capacity of the adsorbent contained in adsorber B (relative to that of adsorber A and to the reference); and C3 and C4 show decreased capacity of the adsorbent contained in adsorber B.

Moreover, the critical parameters for safety of the material and of the production remain acceptable:

unbalance of pressure profile in the two adsorbers: small unbalance of pressure profile of the production capacity: small unbalance of the profile of content in the production capacity: zero

EXAMPLE 3

Unbalance of Selectivity

This example seeks to determine the impact of an unbalance of selectivity of the sieve between adsorbers for a cycle with three adsorbers (A, B and C).

TABLE III

| Test No. | S11 | Sref | S12 | S13 |
|---|---|---|---|---|
| Selectivity of adsorbers A and B | 100 | 100 | 100 | 100 |
| Selectivity of adsorber C | 90 | 100 | 105 | 110 |
| Flow rate | 96 | 100 | 101 | 101 |
| Specific energy | 104 | 100 | 99 | 99 |

Figure 3:
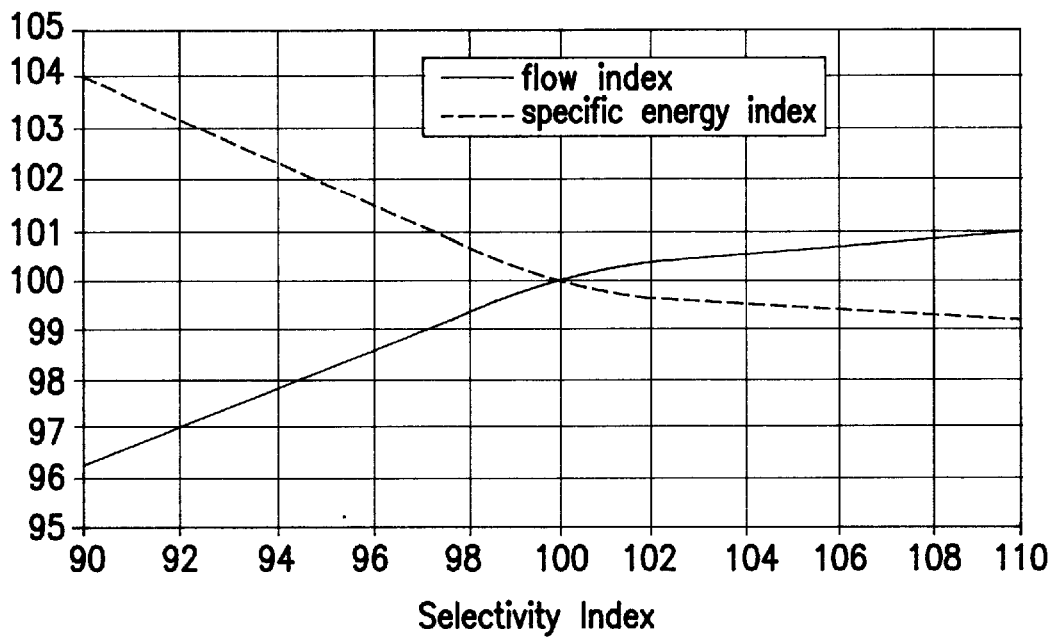

The data shown in the preceding table are schematically shown in FIG. 3. Moreover, the critical parameters have the following developments:

unbalance of pressure profiles in the adsorbers: small
unbalance of the profile of content of production gas: strong

EXAMPLE 4

Unbalance of Capacity

This example seeks to determine the effect of an unbalance of capacity for nitrogen of the sieve for a cycle with three adsorbers (A, B and C).

TABLE IV

| Test No. | C11 | Cref | C12 | C13 |
|---|---|---|---|---|
| Capacity for nitrogen of the adsorbers A and B | 100 | 100 | 100 | 100 |
| Capacity for nitrogen of the adsorber C | 90 | 100 | 105 | 110 |
| Flow rate | 99 | 100 | 99 | 98 |
| Specific energy | 101 | 100 | 101 | 102 |

Figure 4:
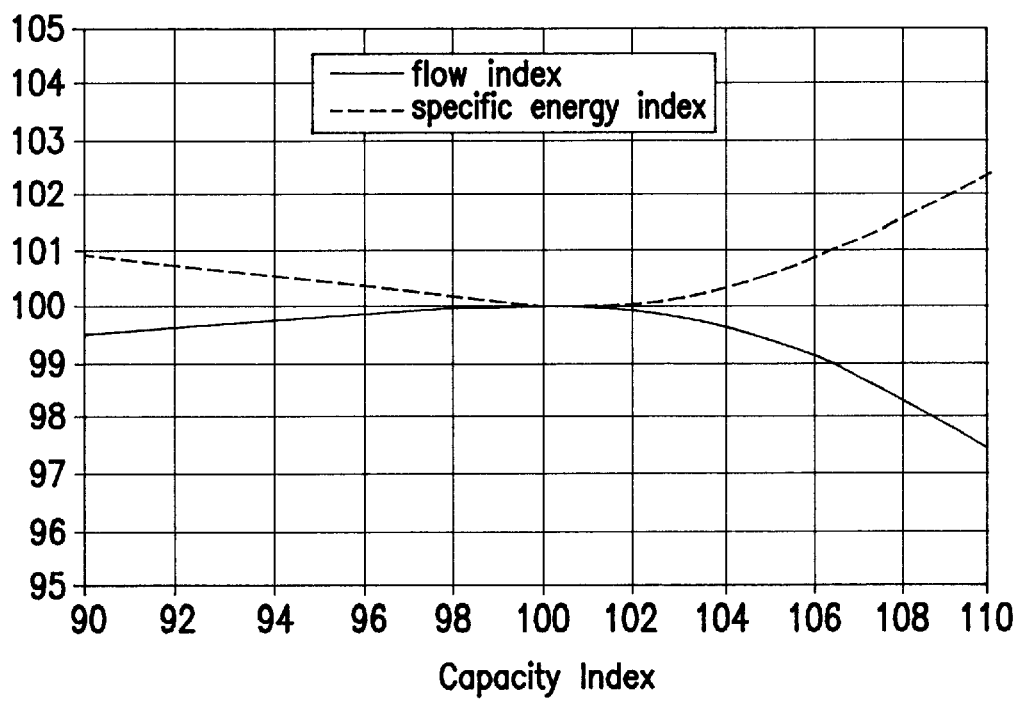

The data shown in the preceding table are schematically shown in FIG. 4.

Moreover, the critical parameters have the following developments:

unbalance of pressure profiles in the adsorbers: small
unbalance of profile of content of the production gas: strong Comment on the Examples As is shown from Examples 1 and 2, in a cycle of two adsorbers, the production flow rate of oxygen is maintained substantially constant over a wide range of heterogeneity of capacity of adsorption of nitrogen, whilst the selectivity of adsorption is maintained (Table II). On the contrary, the same is not true of the specific energy which is, as to itself, subject to substantial fluctuations whilst the nitrogen capacity varies.

There are moreover seen important variations in the performance of the process, which is to say of the flow rate of the gas product and of the specific energy, in the presence of a difference of selectivity between the two adsorbers, even if the nitrogen capacity is maintained substantially constant (Table I).

Still further, the unbalances of the properties of adsorption do not give rise, in a cycle with two adsorbers, to major unbalance imperiling the safety of the material and/or above all the quality, in particular the purity, of the gaseous product, oxygen in this case.

In view of Examples 3 and 4, it will be seen that, in a cycle with three adsorbers, when the unbalanced adsorber, namely adsorber C, has a selectivity lower than its "designed" value (value Sref in Table III) or, respectively, a nitrogen adsorption capacity greater than its "designed" value (value Cref in Table IV), there is produced a rapid degradation of the specific energy or, respectively, of the production flow rate of the process with three adsorbers.

Contrary to the cycle with two adsorbers, in the cycle with three adsorbers there is seen the appearance of a strong unbalance of purity of the gaseous product when the properties of the adsorbent become too heterogeneous from one adsorber to the other because of the absence of production capacity. It is to be noted, in this connection, that this strong unbalance of the cycle with three adsorbers could be overcome at least partially by the addition of a storage capacity to the PSA unit.

In short, these examples of simulation permit showing the not negligible impact of heterogeneity of capacity and/or of selectivity on the performances of the process.

Moreover, they give a basis for estimation of the maximum admissible value of dispersion of the adsorption properties for an industrial molecular sieve before filling the adsorber or adsorbers of the PSA unit with the adsorbent.

More precisely, to take account of the fluctuations of the thermodynamic properties of adsorption from particle to particle on an industrial load of molecular sieve, which is to say the adsorbent, it is necessary to envisage two cases of distribution, namely uniform and gaussian, representative of the extreme distributions enclosing the actual distributions.

For each of these distributions, the most unfavorable case for correct operation of the industrial PSA unit corresponds to selective filling of one of the adsorbers with the portion of the industrial load having the lowest adsorption properties for selectivity or, as the case may be, the greatest for adsorption capacity.

Table V hereafter shows, according to the distribution of the sieve in question and the configuration of the industrial unit (two or three adsorbers), the spread between the means of the adsorption property of the different adsorbers. It must nevertheless be emphasized that, in the case of a unit with three adsorbers, it is supposed that filling of the two adsorbers that do not contain the heterogeneous portion of adsorbent is completely homogeneous.

TABLE V

| Cycle with n adsorbers | n = 2 | n = 3 |
|---|---|---|
| Uniform distribution | $\sqrt{3} \cdot (\sigma/\mu)$ | $\sqrt{3} \cdot (\sigma/\mu)$ |
| Gaussian distribution | $1.35 \cdot (\sigma/\mu)$ | $1.40 \cdot (\sigma/\mu)$ |

In which $\sigma$ and $\mu$ are respectively the standard deviation and the mean of the capacity distribution ($\mu_c$, $\sigma_c$) or, as the case may be, of adsorption selectivity ($\mu_s$, $\sigma_s$) over all of the industrial load of sieve.

It follows that, for a sieve load of any distribution of adsorption capacity ($\mu_c$, $\sigma_c$), there exists, having regard to what precedes and for homogeneous selectivity between the two beds of molecular sieve, a condition on the ratio ($\sigma_c/\mu_c$) leading to maintenance of the performances of the PSA unit at the level contemplated during its design.

This condition of the ratio ($\sigma_c/\mu_c$) is determined from the following hypotheses of dimensioning for a unit with two adsorbers (A and B):

adsorber A: sieve with adsorption capacity $\mu_c$
adsorber B: sieve with adsorption capacity $\mu_c$
production flow rate: $Q=Q_0$
specific energy: $ES=ES_0$ However, these hypotheses of dimensioning require modifications as follows:

adsorber A: sieve with adsorption capacity $\mu_c \cdot (1-x \cdot (\sigma_c/\mu_c))$ adsorber B: sieve with adsorption capacity $(\mu_c \cdot (1+x \cdot (\sigma_c/\mu_c))$ (in which x depends on the type of distribution of the sieve and takes values given in Table V)

production flow rate: $Q=Q_0 \cdot \alpha_1$ specific energy: $ES=ES_0 \cdot \alpha_2$ There is then chosen the boundary or upper limit L of the ratio $(\sigma_c/\mu_c)$ such that, no matter what the type of distribution (gaussian or uniform) with $(\sigma_c/\mu_c) \leq L$, The following equations will be verified:

$$\alpha_1 \geq 0.98 \quad \alpha_2 \leq 1.02$$

This corresponds thus to a maximum drift of 2% from the given performances, which is to say fixed during design of the PSA unit with two adsorbers.

From that, to maintain the performances of the PSA unit (two adsorbers) according to those contemplated during design (with a maximum margin of 2%), for a uniform distribution, the ratio $(\sigma_c/\mu_c)$ must be less than or equal to 0.05 and, for a gaussian distribution, the ratio $(\sigma_c/\mu_c)$ must be less than or equal to 0.07 for the adsorption capacity.

Upon applying the preceding reasoning to an industrial unit with three adsorbers, it will be seen that to maintain the performances of the unit according to those of the design (with a maximum margin of tolerance of 2%), for a uniform distribution, the ratio $(\sigma_c/\mu_c)$ must be less than or equal to 0.03 and, for a gaussian distribution, the ratio $(\sigma_c/\mu_c)$ must be less than or equal to 0.04 for the adsorption capacity.

Applying a similar approach, it has been determined that the conditions of the ratio $(\sigma_s/\mu_s)$ of the distribution of selectivity of an industrial sieve load permitting avoiding a maximum drift of 2% of the performance of the unit relative to the design values of this unit are:

for a cycle with two adsorbers and a uniform distribution: $\sigma_s/\mu_s \leq 0.13$ for a cycle with two adsorbers and a gaussian distribution: $\sigma_s/\mu_s \leq 0.16$ for a cycle with three adsorbers and a uniform distribution: $\sigma_s/\mu_s \leq 0.09$ for a cycle with three adsorbers and a gaussian distribution: $\sigma_s/\mu_s \leq 0.11$ It is to be noted that the cycles with three adsorbers are more sensitive than the cycles with two adsorbers as to the homogeneous character of the sieve, which is to say that the influence of the capacity or the selectivity on the performances and on the critical parameters of the unit is much narrower and greater for a cycle with three adsorbers. Thus, for a dispersion of capacity or selectivity approaching the preceding limit values, the profile of content of the production gas is substantially more unbalanced in a cycle with three adsorbers than in a cycle with two adsorbers.

In a very surprising way, the performances of the VSA process are maintained until a heterogeneity of adsorption properties of the adsorbent can reach high values. In other words, contrary to the teaching of the prior art, it is now possible to use in a PSA process, in particular VSA, a heterogeneous adsorbent.

However, a heterogeneous adsorbent being easier to produce, because less restrictive, it is less expensive than the conventional homogeneous adsorbent.

Because of this, a PSA unit, for example a VSA unit for the production of oxygen, comprising one or several adsorbers filled with heterogeneous adsorbent, leads to a substantial reduction of costs of production of the gas, in particular oxygen, relative to a conventional process using a homogeneous adsorbent.

The present invention is not limited to the field of the production of oxygen from air and can instead be applied to the separation of other gas flows, such as particularly flows containing hydrogen, carbon dioxide and/or carbon monoxide, in particular for the production of synthesis gas or "syngas".

What is claimed is:

1. PSA process for the separation of a gaseous flow containing at least one first component that adsorbs preferentially to at least one adsorbent and at least one second component that adsorbs less preferentially to at least said adsorbent than said first component, the process comprising passing said gaseous flow through said adsorbent to preferentially adsorb said at least one first component, said adsorbent being a heterogeneous adsorbent comprising particles of adsorbent having a distribution of adsorptive capacity for nitrogen with a ratio $(\sigma_c/\mu_c)$ comprised between about 0.02 and 0.15, or having a distribution of selectivity of adsorption for nitrogen relative to oxygen with a ratio $(\sigma_s/\mu_s)$ comprised between about 0.02 and 0.25, or having both said distributions, wherein $\sigma_c$ designates a standard deviation of the distribution of adsorptive capacity, and $\mu_c$ a mean of said distribution of adsorptive capacity; and $\sigma_s$ designates a standard deviation of the distribution of selectivity of adsorption, and $\mu_s$ a mean of said distribution of selectivity of adsorption.

2. A process according to claim 1, wherein the gaseous flow to be separated comprises oxygen and nitrogen.

3. A process according to claim 1, wherein said gaseous flow to be separated comprises air.

4. A process according to claim 1, wherein said first component is nitrogen and said second component is oxygen.

5. A process according to claim 1, which is a VSA process.

6. The process according to claim 1, wherein the ratio $(\sigma_c/\mu_c)$ is comprised between about 0.02 and 0.10, and the ratio $(\sigma_s/\mu_s)$ is comprised between about 0.02 and 0.20.

7. The process according to claim 1, wherein the adsorbent is an exchanged or non-exchanged zeolite.

8. The process according to claim 1, wherein the adsorbent is a member selected from the group consisting of zeolites of type X, Y, A, ZSM-3, ZSM-5, mordenite, faujasite and clinoptilolite.

9. The process according to claim 1, wherein the adsorbent contains cations selected from the group consisting of lithium, sodium, calcium, zinc, copper, aluminum, potassium, manganese, strontium, nickel and mixtures thereof.

10. The process according to claim 1, wherein the adsorbent contains at least one of at least 50% cations of lithium, at least 10% cations of calcium and at least 5% cations of zinc.

11. The process according to claim 1, wherein the adsorbent has a Si/Al ratio of 1 to 1.25.

12. The process according to claim 1, wherein the adsorbent has a Si/Al ratio of about 1.

* * * * *